United States Patent [19]

Israelsen et al.

[11] Patent Number: 5,204,899
[45] Date of Patent: Apr. 20, 1993

[54] VECTOR QUANTIZATION METHOD EMPLOYING MIRRORED INPUT VECTORS TO SEARCH CODEBOOK

[75] Inventors: Paul D. Israelsen, North Logan, Utah; Keith Lucas, Richmond Hill, Canada

[73] Assignee: Scientific-Atlanta, Inc., Atlanta, Ga.

[21] Appl. No.: 794,563

[22] Filed: Nov. 19, 1991

[51] Int. Cl.[5] .......................................... H04N 7/167
[52] U.S. Cl. ...................................... 380/14; 380/10; 358/133; 341/200
[58] Field of Search ...................... 380/10, 14; 381/30, 381/35; 358/133, 135, 136; 341/200

[56] References Cited

U.S. PATENT DOCUMENTS

| | | | |
|---|---|---|---|
| 4,560,977 | 12/1985 | Murakami et al. | 380/10 X |
| 4,639,778 | 1/1987 | Yamaguchi et al. | 358/135 |
| 4,979,039 | 12/1990 | Kisor et al. | 358/133 |
| 5,010,401 | 4/1991 | Murakami et al. | 358/136 |
| 5,021,971 | 6/1991 | Lindsay | 364/513 |
| 5,067,152 | 11/1991 | Kisor et al. | 380/10 |
| 5,068,723 | 11/1991 | Dixit et al. | 358/133 |
| 5,086,439 | 2/1992 | Asai et al. | 358/133 X |
| 5,107,345 | 4/1992 | Lee | 358/136 X |

OTHER PUBLICATIONS

Nasrabadi, N. et al.; "Image Coding Using Vector Quantization: A review"; *IEEE Comm;* vol. 36 No. 8; Aug. 1988.
Gray, R. M.; "Vector Quantization"; IEEE ASSP Mag. vol. 1 pp. 4–29; Apr., 1984.
"Vector Quantization of Digital Images", Baker, Richard L., Stanford University–University Microfilms International, *UMI Dissertation Information Service,* (Copyright, 1984).

*Primary Examiner*—Tod R. Swann
*Attorney, Agent, or Firm*—Woodcock Washburn Kurtz Mackiewicz & Norris

[57] ABSTRACT

A vector quantization me employs mirrored input vectors to increase the reproduction quality of transmitted vector quantized data. A codevector is selected from a vector quantization codebook for each possible orientation of an input vector. The codevector having the smallest distortion relative to the input vector is selected for transmission. An identification code identifying the selected orientation is also transmitted.

20 Claims, 10 Drawing Sheets

VECTOR QUANTIZATION METHOD EMPLOYING MIRRORED INPUT VECTORS TO SEARCH CODEBOOK

FIELD OF THE INVENTION

The present invention relates generally to a vector quantization method, and more particularly, to a vector quantization method wherein a vector quantization codebook is searched with each of a plurality of orientations of an input vector to increase the reproduction quality of transmitted vector quantized data.

BACKGROUND OF THE INVENTION

The background of the present invention is described herein in the context of pay television systems, such as cable television systems or direct broadcast satellite (DBS) systems, that distribute program material to subscribers, but the invention is by no means limited thereto except as expressly set forth in the accompanying claims.

In a typical cable television system, cable television operators receive much of their program material from remote earth station transmitters via a plurality of geosynchronous orbit satellites. The cable operator selects the program material to be made available to its subscribers by making arrangements with the satellite distributors of that program material. The cable operator receives the transmitted program material at its "cable head-end," where it then re-transmits the data to individual subscribers. Frequently, cable operators also provide their own local programming at the site of the head-end, and further include network broadcasts as well.

In a DBS system, individual subscribers are provided with their own satellite receiver. Each subscriber establishes a down-link with the broadcasting satellite directly. Thus, there is no need, as with cable systems, for re-transmission from a cable head-end.

Typically, in both types of systems (cable and DBS), the program material (both video and audio) is originally in analog form. Conventional transmission techniques place substantial limitations on the maximum number of viewer channels that can be transmitted over any given transponder on a satellite since each channel requires a minimum bandwidth to avoid noticeable degradation and the total number of channels that can be transmitted over a given satellite transponder is limited by the bandwidth of each signal, and of the transponder. Also, in cable systems, the electrical properties of the coaxial cable and associated amplifiers limit its bandwidth and therefore place substantial limitations on the number of channels that can be delivered to cable television subscribers using conventional transmission techniques.

As a result of the desire to provide more program channels to subscribers over existing broadcast bandwidths, the pay television industry has begun to investigate digital image transmission techniques. Although the desire is to minimize the transmission bandwidth of program material, thus allowing more channels to be transmitted over existing media, digital image transmission further offers the advantage that digital data can be processed at both the transmission and reception ends to improve picture quality. Unfortunately, the process of converting the program material from analog form to digital form results in data expansion which increases the transmission bandwidth of the program material rather than decreasing it. Therefore, digital transmission alone does not solve the bandwidth problem, but instead makes it worse. However, through the application of digital data compression techniques, large bandwidth reductions can be achieved.

Data compression techniques minimize the quantity of data required to represent each image. Thus, more program material, or more channels, can be offered over an existing channel. However, any data compression achieved is offset by the data expansion which occurs during the analog to digital conversion. Therefore, to be practical, the compression technique employed must achieve a compression ratio large enough to provide a net data compression. Digital data compression techniques, such as Huffman encoding and LZW (Lempel, Ziv and Welch) encoding, offer, at best, compression ratios of 2.5 to 1 and do not sufficiently compensate for the amount of data expansion that occurs in converting data from analog to digital form.

In response to the need for large compression ratios, a number of so-called "lossy" compression techniques have been investigated for digital image compression. Unlike the Huffman and LZW encoding techniques, these "lossy" compression techniques do not provide exact reproduction of the data upon decompression. Thus, some degree of information is lost; hence the label "lossy." One such "lossy" compression technique is called DCT (discrete cosine transform) data compression. Another method, which, until recently, has been used principally for speech compression, is vector quantization. Vector quantization has shown promise in image compression applications by offering high image compression rates, while also achieving high fidelity image reproduction at the receiving end. It has been demonstrated, for example, that using vector quantization (hereinafter sometimes referred to as "VQ"), compression rates as high as 25:1, and even as high as 50:1, can be realized without significant visually perceptible degradation in image reproduction.

Compression of Video images by vector quantization involves dividing the pixels of each image frame into smaller blocks of pixels, or sub-images, and defining a "vector" from relevant data (such as intensity and/or color) reported by each pixel in the sub-image. The vector (sometimes called an "image vector") is really nothing more than a matrix of values (intensity and/or color) reported by each pixel in the sub-image. For example, a black and white image of a house might be defined by a 600×600 pixel image, and a 6×4 rectangular patch of pixels, representing, for example, a shadow, or part of a roof line against a light background, might form the sub-image from which the vector is constructed. The vector itself might be defined by a plurality of gray scale values representing the intensity reported by each pixel. While a black and white image serves as an example here, vectors might also be formed from red, green, or blue levels of a color image, or from the Y, I and Q components of a color image, or from transform coefficients of an image signal.

Numerous methods exist for manipulating the block, or sub-image, to form a vector. R. M. Gray, "Vector Quantization", *IEEE ASSP Mag.*, pp. 4–29 (April, 1984), describes formation of vectors for monochrome images. E. B. Hilbert "Cluster Compression Algorithm: A Joint Clustering/Data Compression Concept", Jet Propulsion Laboratory, Pasadena, Calif., Publ. 77–43, describes formation of vectors from the color components of pixels. A. Gersho and B. Ramamurthi, "Image Coding Using Vector Quantization", *Proc. IEEE Int. Conf. Acoust., Speech, Signal Processing.* pp. 428–431 (May, 1982), describes vector formation from the intensity values of spatially contiguous groups of pixels. All of the foregoing references are incorporated herein by reference.

By way of example, a television camera might generate an analog video signal in a raster scan format having 600 scan lines per frame. An analog to digital converter could then digitize the video signal at a sampling rate of 600 samples per scan line, each sample being a pixel. Digital signal processing equipment could then score the digital samples in a 600×600 pixel matrix. The 600×600 pixel matrix could then be organized into smaller blocks, for example 6×4 pixel blocks, and then each block could be converted to an input vector.

In an image vector quantizer, a vector quantization "codebook" is created from training data comprising a representative sample of images which the quantizer is likely to encounter during use. The codebook consists of a memory containing a set of stored "codevectors," each representative of commonly encountered image vectors. For example, one codevector might be a 6×4 pixel solid black patch. Another codevector might have all white pixels in the top three rows, and all black pixels in the bottom three rows. Yet another codevector might have a gradient made up of white pixels in the top row, black pixels in the bottom row, and four rows of pixels in between having shades of gray from light to dark. Typically, a codebook of representative codevectors is generated using an iterative clustering algorithm, such as described in S. P. Lloy, "Least Squares Optimization in PCM", *Bell Lab. Tech. Note* (1957) (also found in IEEE Trans. Inform. Theory, Vol. IT-28, pp. 129–127, March (1982); and, J. T. Tou and R. C. Gonzelez, "Pattern Recognition Principles", pp. 94–109, Addison-Wesley, Reading, Mass. (1974). Both of these references are incorporated herein by reference.

Each codevector in the codebook is assigned a unique identification code, sometimes called a label. In practice, the identification codes, or labels, are the memory addresses of the codevectors. For each input image vector, data compression is achieved by selecting the codevector in the codebook that most closely matches the input image vector, and then transmitting the codebook address of the selected codevector rather than the input image vector itself. Compression results because generally, the addresses of the selected codevectors are much smaller than the image vectors. At the receiving end, an identical codebook is provided. Data recovery is achieved by accessing the receiver codebook with the transmitted address to obtain the selected codevector. Because the selected codevector closely resembles the original input vector, the input vector is substantially reproduced at the receiver. The reproduced input vector can then be converted back to the block of pixels that it represents. Thus, in this manner, an entire image can be reconstructed at the receiver.

Some distortion of the original image does result, however, due to inexact matches between the input vectors and the selected codevectors. Remember, the codevectors in the codebook are only a representative sample of possible input vectors, and therefore, exact matches rarely occur during actual use of the quantizer. Increasing the size of the codebook used for compression and decompression generally decreases the distortion. Unfortunately, increasing the size of the codebook is disadvantageous because the cost of memory can be prohibitive. Typical codebooks already contain a large number of representative codevectors and require a large amount of memory. Memory increases often are not affordable. Consequently, there is a need for a vector quantization method decreases distortion without an increase in codebook memory.

One prior art method can be used to satisfy this need. The method, referred to as "reflected VQ", is disclosed in R. L. Baker, "Vector Quantization of Digital Images", Ph.D. Dissertation, Stanford University, Department of Electrical Engineering 153-62 (1984), which is incorporated herein by reference. With the "reflected VQ" method, a given level of distortion can be maintained with a smaller number of representative codevectors, and therefore, less codebook memory is required. The memory saved by employing the "reflected VQ" method can then be used to hold more representative codevectors. As mentioned above, a greater number of representative codevectors will reduce the overall distortion of reproduced images. Therefore, with "reflected VQ," a decrease in distortion can be achieved with no net increase in codebook memory.

Briefly, the "reflected VQ" method takes advantage of the symmetry commonly found in image data. For example, note that, in the case of entertainment television, the mirror image on the Y axis of a television picture is often (but not always) another valid image. Symmetry about the x-axis is also sometimes present, but somewhat less so. As a result of this symmetry, a typical two-dimensional image frame often will contain sub-images (i.e., smaller blocks of pixels) that are substantial mirror images of each other about either the x-axis, the y-axis or both. Consequently, a single vector can represent each of these sub-images by simply mirroring the vector accordingly. When the sub-images are rectangular, one vector can represent up to four symmetrical sub-images by mirroring the vector about the x-axis, or the y-axis or both. When the sub-images are square, one vector can represent up to eight symmetrical sub-images because in addition to mirroring about the x-axis and y-axis, the vector can be rotated 90 degrees.

"Reflected VQ" takes advantage of the symmetry described above to achieve a reduction in codebook size. For example, consider a vector quantizer that organizes image frames into rectangular sub-images. Because of image frame symmetry, four visually different sub-images in effect may be the same sub-image simply mirrored about the x-axis, y-axis or both. Consequently, an input vector constructed from one of these sub-images can be used to represent each of the other sub-images by mirroring the vector accordingly. Different mirror images of a vector are referred to as "orientations" of the vector. Thus, an input vector constructed from a rectangular sub-image has four possible orientations. Rather than employing a codebook that contains codevectors for all orientations of an input vector, "reflected VQ" employs a codebook that contains codevectors for only one input vector orientation; in other words the codebook contains codevectors all having one general orientation. Then, prior to comparing an input vector to the codebook, the input vector is re-oriented, if necessary, such that its orientation matches the general orientation of the codevectors in the codebook. After selecting the codevector which most closely resembles the re-oriented input vector, an indication of the address of the selected codevector is transmitted along with additional information specifying the "reflections"/"mirroring" necessary to recover the original orientation of the input vector.

At the receiving end, the selected codevector is retrieved from the receiver codebook and re-oriented to match the original orientation of the input vector, thereby reproducing the input vector in its original orientation. Thus, in this manner, four visually different input vectors (representing mirror images of the same rectangular subimage) can be reproduced at the receiving location using a single codevector. By storing codevectors in only a single orientation, approximately a 4-to-1 reduction in codebook size (or 8-to-1 if the vector is square) can be achieved assuming two-dimensional rectangular sub-images; when square sub-images are employed approximately an 8-to-1 reduction in codebook size can be achieved. If desired, the memory saved can be used to hold more representative codevectors, resulting in an overall decrease in image distortion. Thus, with no net increase in memory, image distortion can be reduced.

Although "Reflected VQ" does achieve a reduction in distortion without a net increase in codebook size, the computational complexity of VQ encoders employing this method increases. A VQ encoder employing the "reflected VQ" method must be capable of determining the general orientation of each input vector so that the encoder can re-orient the input vector, if necessary, to match the general orientation of the codevectors in the codebook. This additional complexity increases the cost of VQ encoders employing the "reflected VQ" method. Therefore, there is a need for a vector quantization method that achieves a reduction in overall distortion without an increase in codebook memory and without a substantial increase in decoder cost.

The method of the present invention satisfies this need.

SUMMARY OF THE INVENTION

Briefly stated, the present invention is directed to a vector quantization method that employs mirrored input vectors to increase the reproduction quality of transmitted vector quantized data. In the preferred embodiment, the method is embodied in a pay television system wherein image data (usually program material, such as movies, etc.) is vector quantized at a transmitter location of pay television signals for transmission via satellite to a plurality of receiving locations. The image data typically comprises temporally spaced image frames representing moving images to be displayed on a television set at each receiving location.

The method comprises first receiving an image frame to be transmitted, organizing the image frame into blocks of image frame data, and converting each block of image data to a multi-dimensional input vector. Each input vector has a plurality of possible orientations. An identifying code is assigned to each orientation.

A first vector quantization codebook having a plurality of codevectors is provided in a memory at the transmitter location. The codevectors are representative of possible input vectors. Additionally, each codevector has an associated memory address.

For each input vector, the following steps are performed. First, one of the orientations of the input vector is selected. The input vector with the selected orientation is then compared to the codevectors in the codebook, and the codevector that most closely resembles the input vector (in the selected orientation) is selected from the codebook. A measure of difference is then obtained between the input vector with the selected orientation and the selected codevector. A different one of the remaining orientations of the input vector is then selected, i.e., the input vector is re-oriented such that it has a different one of its possible orientations. The input vector, in its newly selected orientation, is again compared to the codevectors in the codebook and the codevector that most closely resembles the input vector (in its newly selected orientation) is selected. Again a measure of difference is obtained between the input vector in the selected orientation and its associated codevector. This continues until each orientation of the input has been so processed.

Next, the orientation and associated codevector that produced the least measure of difference are selected. An indication of the identifying code of the selected orientation and the address of its associated codevector is then transmitted to the plurality of receiving locations.

At each receiving location, the indication is received and the identifying code and associated codevector address are obtained therefrom. A second vector quantization codebook, identical to the first codebook at the transmitter location, is provided in a memory at each receiving location. Data recovery is achieved by retrieving from the second codebook the codevector residing at the obtained address. The retrieved codevector is an identical reproduction of the codevector selected at the transmitting location. The identifying code and the reproduced codevector are then employed to re-orient the reproduced codevector, if necessary, so as to substantially re-create the input vector in its original orientation. The block of pixels is then re-constructed from the input vector for display on a television set. In this manner, the temporally spaced image frames can be communicated to each of the receiving locations for display on a television set at each location.

In an alternate embodiment, the method of the present invention is combined with a three-dimensional vector quantization method. With three-dimensional vector quantization, pixels are selected from an identical portion of each of a plurality of temporally spaced image frames. A three-dimensional input vector is then constructed from the pixels selected from each portion. Two dimensions of the input vector represent the spatial relationship between pixels in each frame and the third dimension represents the temporal spacing between the pixels in successive frames.

Other features of the invention will become evident from the following drawings and specification.

BRIEF DESCRIPTION OF THE DRAWINGS

The foregoing summary, as well as the following detailed description of the preferred embodiment, is better understood when read in conjunction with the appended drawings. For the purpose of illustrating the invention, there is shown in the drawings, an embodiment that is preferred, it being understood, however, that the invention is not limited to the specific methods and instrumentalities disclosed. In the drawings.

DETAILED DESCRIPTION OF THE PREFERRED EMBODIMENT

Before proceeding to the description of the drawings, it should be understood that, although the invention is described herein in the context of broadcasting television signals, such as movies and the like, in a pay television system, the present invention is in no way limited thereto. Rather, the present invention may be employed wherever it is desired to compress and transmit any type of data, including image data, voice data, etc. The term "pay television" and "pay television subscriber" is used in the instant specification and accompanying claims to encompass both cable television and direct broadcast satellite applications. However, as mentioned above, the invention is by no means limited to pay television systems, but has application to conventional (i.e., free) television transmission and reception.

Figure 1:
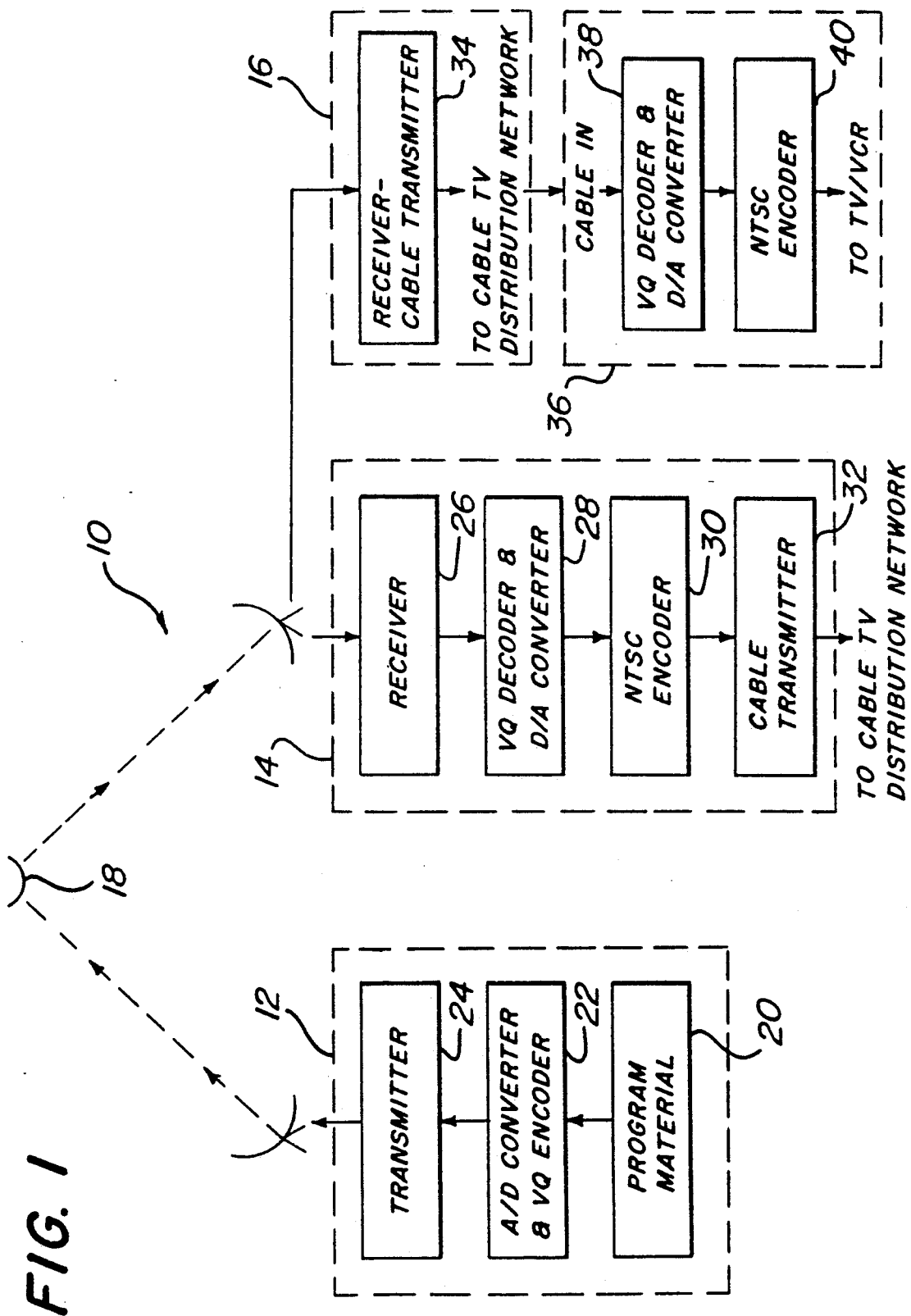
FIG. 1 is a block diagram illustrating an application of the present invention to a pay television system employing satellite communication to transmit program material.

Referring now to the drawings, wherein like numerals indicate like elements, there is illustrated in FIG. 1 an exemplary application of a vector quantization image compression system according to the present invention wherein moving image data (e.g., television signals, such as movies, etc.) is communicated from a transmitter location of pay television signals 12 to receiving locations such as 14 or 16. Typically, the transmitter location 12 might include a source 20 of program material that supplies movies, and the like in analog form to an apparatus (encoder) 22 for digitization and data compression by vector quantization. The details of a typical apparatus 22 can be found in Nasrabadi, N. M. and King, R. A., "Image Coding Using Vector Quantization: A Review", *IEEE Comm.*, Vol. 36, No. 8 (August 1988); Gray, R. M., "Vector Quantization", *IEEE ASSP Mag..* Vol 1, pp. 4-29, (April 1984); and R. L. Baker, "Vector Quantization of Digital Images", Ph.D. Dissertation, Stanford University, Department of Electrical Engineering pp. 32-48 (1984). The apparatus 22 can be constructed as described in the above cited references, but modified in accordance with the teachings of the present invention. However, the apparatus 22 may be constructed in any suitable manner without deviating from the spirit and scope of the present invention.

Compressed, digitized data is transmitted to a satellite 18, via transmitter 24, for reception by a plurality of receiving locations (earth stations) such as 14 or 16. The receiving locations may be the head-end of a cable television distribution system (e.g., locations 14 or 16) of the type which receives signals from the satellite 18 and distributes them to a plurality of subscribers via coaxial cable. Alternatively, as will be explained in connection with FIG. 2, one or more of the receiving locations may be DBS (direct broadcast satellite) subscribers who receive signals directly from the satellite 18. Returning now to the cable television application of FIG. 1, there is shown two types of cable head end installations 14, 16 that may receive the down-link from the satellite 18. The cable head-end installation 14 may employ the received data in a different manner than the cable head end installation 16, however, the end result (availability of image data for display or recording) is the same to the cable television subscribers of each system. The two examples of cable head-end installations 14, 16 are shown to demonstrate the versatility of the present invention.

The cable head-end installation 14 may receive the data transmitted by the station 12 via the receiver 26, then employ an on-site apparatus (decoder) 28 for decompressing the received data and converting the same back to analog form. The details of a typical apparatus 28 can be found in Gray, R. M., "Vector Quantization", *IEEE ASSP Mag.* Vol. 1, pp. 4-29 (April 1984). The apparatus 28 can be constructed as described in the above cited reference, but modified in accordance with the teachings of the present invention. However, the apparatus 28 may be constructed in any suitable manner without deviating from the spirit and scope of the present invention. Another on-site apparatus 30 may convert the analog data to conventional NTSC signals for transmission over the cable to subscribers in conventional form. Thus, in the case of cable head-end installation 14, the cable head-end operator distributes analog NTSC cable television signals to subscribers in conventional form.

In the case of the cable head end installation 16, the data transmitted by station 12 may be received via a receiver/transmitter 34 that conditions the received data for transmission over the cable system to cable television subscribers. That is, the operator of the cable head end system 16 does not decode or decompress the received data, nor does it convert the same to analog form. Rather, the operator of the cable head-end system 16 simply transmits the compressed image data over cable television system for receipt by the subscribers. Subscribers of the system 16 must therefore be provided with VQ decoder boxes 36, whereas subscribers to the system 14 may employ conventional set-top decoders. The VQ decoder boxes 36, in general, comprise a VQ decoder 38 for decompressing received data and converting the same to analog form and an apparatus 40 for converting the analog data to NTSC format for display on a TV or recording on a VCR. The apparatus 38 of the system 16 may be identical to the apparatus 28 of the system 14. The decoder box 36 may be embodied as a set-top decoder, or may be built into a television set or VCR.

While subscribers to the system 16 must use the above-described decoder box 36, an advantage of the system 16 is that, due to the highly compressed nature of the image data sent over the cable distribution network by the cable operator, many more channels may be transmitted over the cable to subscribers as may be transmitted over the cable in the system 14. Alternatively, the system 16 enables transmission of HDTV signals without sacrificing other channel space.

Figure 2:
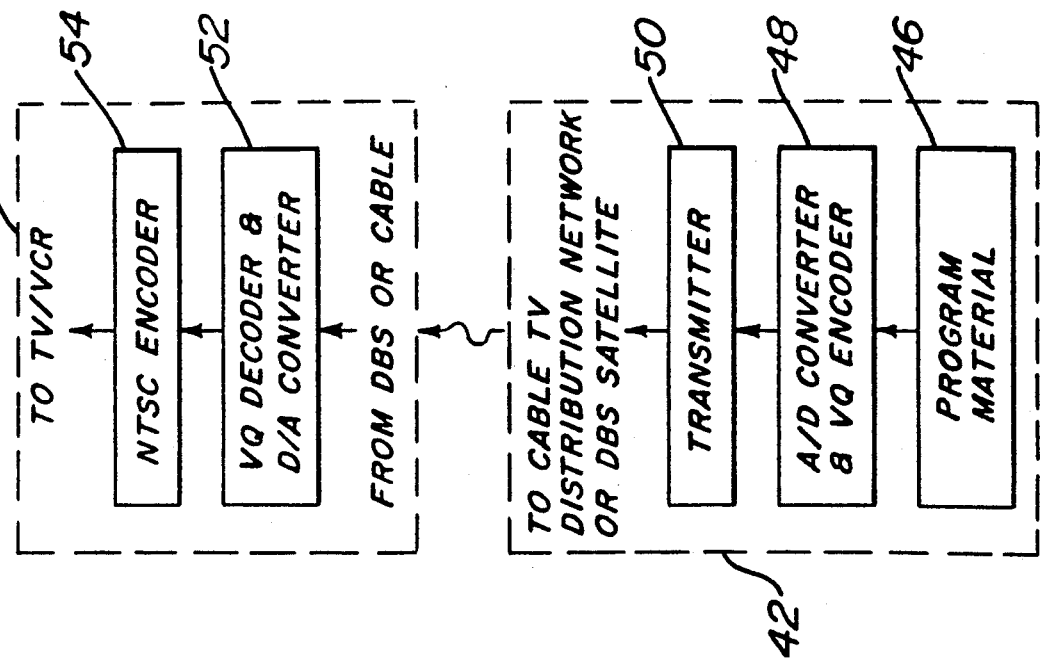
FIG. 2 is a block diagram illustrating another application of the invention to a pay television system employing cable or direct broadcast satellite for transmitting program material.

FIG. 2 illustrates another application of the present invention, also to a pay television system. In the system of FIG. 2, block 42 represents a cable or DBS head-end. The operator of the head end 42 may insert program material 46 (such as network television stations, video tapes, etc.) directly at the locale of the head-end for transmission (via either cable or DBS) to the subscribers. Thus, as shown in FIG. 2, the head-end 42 may include an apparatus (encoder) 48 for digitizing and compressing the locally provided program material 46, and a transmitter 50 for transmitting data from encoder 48 (again, via either cable or satellite) to each of the subscribers. The encoder 48 of FIG. 2 may be identical to the encoder 22 of FIG. 1.

Each subscriber to the system of FIG. 2 is equipped with a decoder box 44 (that may be identical to the decoder box 36 of FIG. 1) that comprises an apparatus (decoder) 52 for decompressing received data and converting the same to analog form. The decoder 44 may also be provided with an apparatus 54 for placing the analog data into NTSC format for display on a television set or for recording via a VCR. As in the case of decoder box 36, the decoder 44 may be embodied as either a set-top decoder box, or may be built into a television set or VCR.

Figure 3:
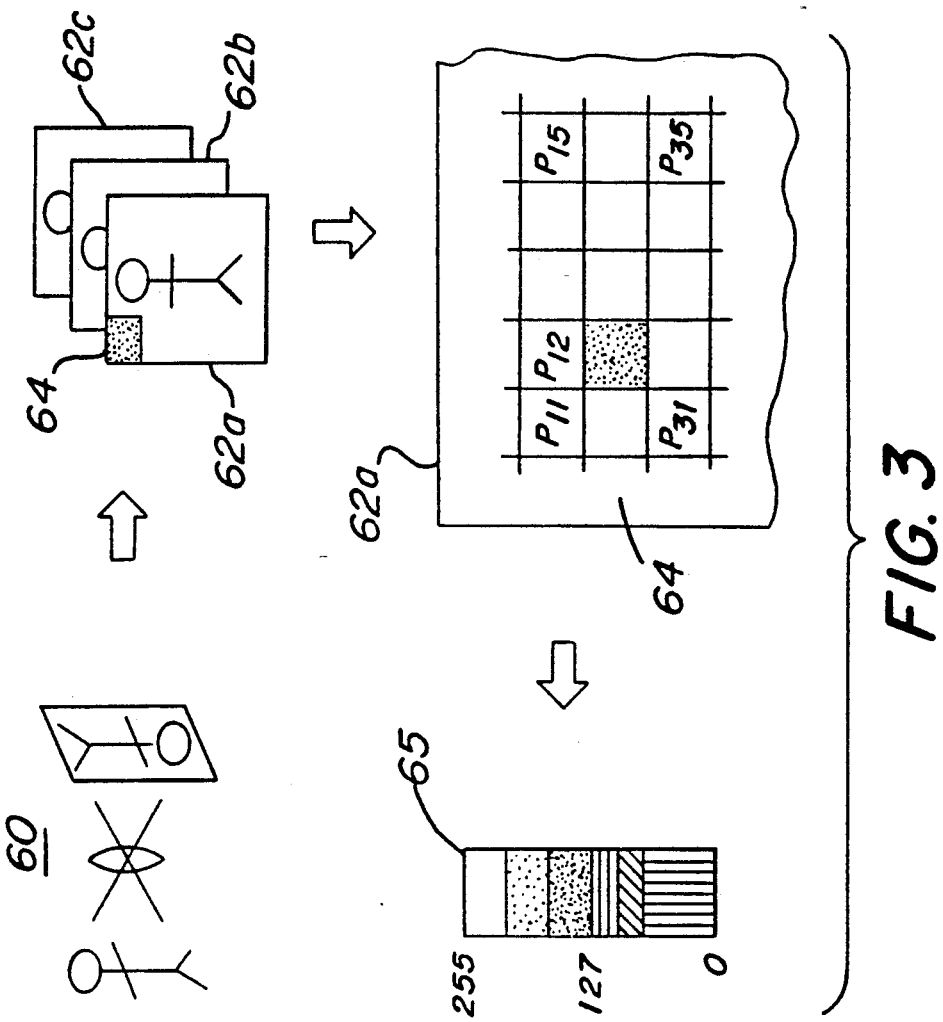
FIG. 3 graphically illustrates the concept of constructing input (image) vectors from pixels of image frames.
Figures 4, 5:
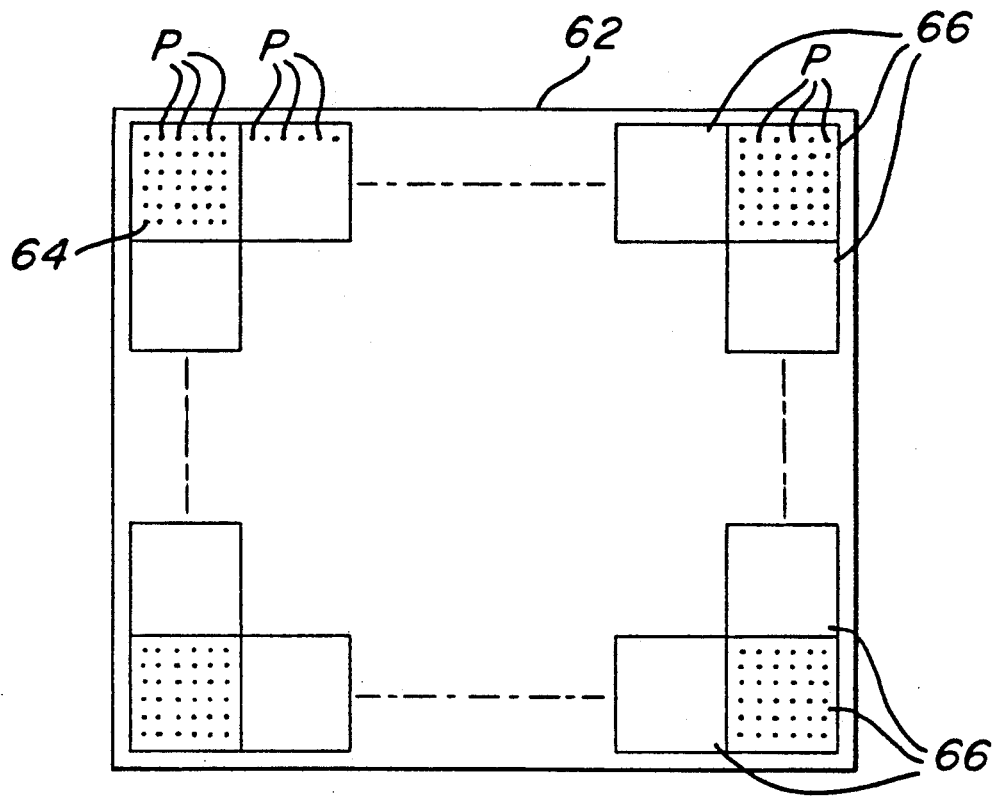
FIG. 4 graphically illustrates an image frame as defined by a plurality of pixels and organized into a plurality of sub-images.
FIG. 5 illustrates an exemplary memory for storing a vector quantization codebook.

FIG. 3 illustrates the concept of converting moving or dynamic images 60, such as program material 20 or 46, into input image vectors for vector quantization. The concept illustrated in FIG. 3 is well known. See, for example, R. L. Baker, "Vector Quantization of Digital Images", Ph.D. Dissertation, Stanford University, Department of Electrical Engineering (1984); Gray, R. M., "Vector Quantization", *IEEE ASSP Mag.*, Vol. 1, pp. 4,29 (April 1984); Goldberg, M., Boucher, P. R. and Shlien, S., "Image Compression Using Adaptive Vector Quantization", *IEEE Comm.*, Vol. COM-34 No. 2 (February 1986); and, Nasrabadi, N. M. and King, R. A., "Image Coding Using Vector Quantization; A Review", *IEEE Comm.*, Vol. 36, No. 8 (August 1988). As shown in FIG. 4, and as is common in the art, the temporally spaced image frames 62a, 62b, 62c, etc. representing the moving image 60 are defined by a plurality of pixels P. In the case of a black and white image, each pixel P reports an intensity value, whereas in the case of a color image, each pixel may report luminance and chrominance values, or other values indicative of a color associated with the pixel.

As mentioned in the background section above, in vector quantization of an image, e.g., image frame 62a, the pixels P of each image frame 62 are grouped into blocks that define sub-images 66 of each image frame (illustrated in FIG. 4). Each of these blocks, which is a matrix of pixels, defines an input image vector. Thus, in FIG. 3, a sub-image 64 of image frame 62a is represented by the block of pixels $P_{11}$, $P_{12}$, ... $P_{35}$. This matrix of pixels defines one input image vector for image frame 62a. Image frame 62a, as well as each succeeding image frame 62b, 62c, etc., will usually be represented by a plurality of input image vectors (i.e., one input vector for each sub-image).

As graphically shown at 65 of FIG. 3, the intensity and/or color values reported by each pixel P are digitized (by the A/D converter shown at 22 and 48 of FIGS. 1 and 2). For example, each intensity or color value may be represented by an 8 bit digital word such that 256 intensity and/or color levels are possible for each pixel. Thus, in the case of a black and white image, only one input vector, containing the intensity values reported by each pixel in the block, is required for each block or sub-image. However, in the case of a color image, it may be desirable to provide several input image vectors for each block or sub-image, e.g., one input image vector containing intensity data and another containing color data. Another possibility is that three input image vectors are provided for each block in a color image, one containing Y data, another containing I data, and a third containing Q data. Alternatively, a three-dimensional vector quantization method, described hereinafter, may be employed to construct a single input vector containing the data in each of these vectors. In vector quantization, each of these input image vectors is then compared to the codevectors stored in the codebook to select a best match codevector for each.

It will be appreciated from the foregoing that, in the case of image data, input vectors will usually be multi-dimensional and usually have at least two dimensions (e.g., the matrix of intensity values shown in FIG. 3). However, there may be instances where input vectors are uni-dimensional, for example, where input vectors are constructed from the intensity values of only single rows or columns of pixels. Input vectors may have more than two dimensions, for example, where input vectors are constructed from pixel blocks of temporally spaced images (known as three dimensional vector quantization and described hereinafter in greater detail), and/or where data in addition to intensity data (e.g., color) is included in each vector.

As mentioned in the background, and as is understood by those skilled in the art, vector quantization is carried out by comparing each input vector to the codevectors in a vector quantization codebook and selecting the codevector that most closely resembles the input vector. A vector quantization codebook typically comprises a large number of codevectors stored in an electronic memory. An exemplary codebook memory is illustrated in FIG. 5. The codevectors (CV) are stored in the memory (M) and each codevector (CV) has an associated address (A) as described in the background. As also mentioned in the background, data compression results because rather than transmitting an input vector, only the address of the selected codevector is transmitted; the length of a codevector address is typically much shorter than the length of each input vector.

As is understood by those skilled in the art, many different techniques for searching a codebook to find the codevector that best matches the image vector have been proposed, but generally the methods can be classified as either a full search technique, or a branching (or tree) search technique. In a full search technique, the vector quantizer sequentially compares an input image vector to each and every codevector in the codebook. The vector quantizer computes a measure of distortion for each codevector and selects the one having the smallest distortion. The full search technique ensures selection of the best match, but involves the maximum number of computational steps. Thus, while distortion can be minimized using a full search technique, it is computationally expensive. Y. Linde, A. Buzo and R. Gray, "An Algorithm For Vector Quantizer Design", *IEEE Transactions on Communications*, Vol. COM-28, No. 1 (January 1980), incorporated herein by reference, describes the full search technique and the computational steps involved in such a search. The full search technique is sometimes called "full search vector quantization" or "full search VQ".

The tree search technique can be thought of as one that searches a sequence of small codebooks, instead of one large codebook. The codebook structure can be depicted as a tree, and each search and decision corresponds to advancing one level or stage in the tree, starting from the root of the tree. Thus, the input vector is not compared to all the codevectors in the codebook, as with the full search technique. Consequently, the tree search technique reduces the number of codevectors that must be evaluated (and thus reduces search time). However, the more limited search generally does not guarantee selection of the optimum codevector. Therefore, a tree search vector quantizer requires a larger codebook memory to achieve the same level of distortion as the full-search technique. A detailed description of the tree search technique may be found in R. M. Gray and H. Abut, "Full Search and Tree Searched Vector Quantization of Speech Waveforms," *Proc. IEEE Int. Conf. Acoust., Speech, Signal Processing*, pp. 593-96 (May 1982), and R. M. Gray and Y. Linde, "Vector Quantization and Predictive Quantizers For Gauss Markov Sources", *IEEE Trans. Comm.*, Vol. COM-30, pp. 381-389 (February 1982), both of which are incorporated herein by reference. The tree search technique is sometimes referred to as "tree-search vector quantization", "tree-search VQ" and "TSVQ." This technique has found favor for compressing dynamic images, because it is computationally faster than the full search technique. However, as mentioned, tree-search VQ does not guarantee selection of the optimum codevector, and therefore, a larger codebook memory is required to achieve a given level of distortion than is required for full search VQ.

It is understood by those skilled in the art that the present invention is not limited to any one of these search techniques. Thus, any search technique may be employed without deviating from the spirit and scope of the present invention.

Figure 6:
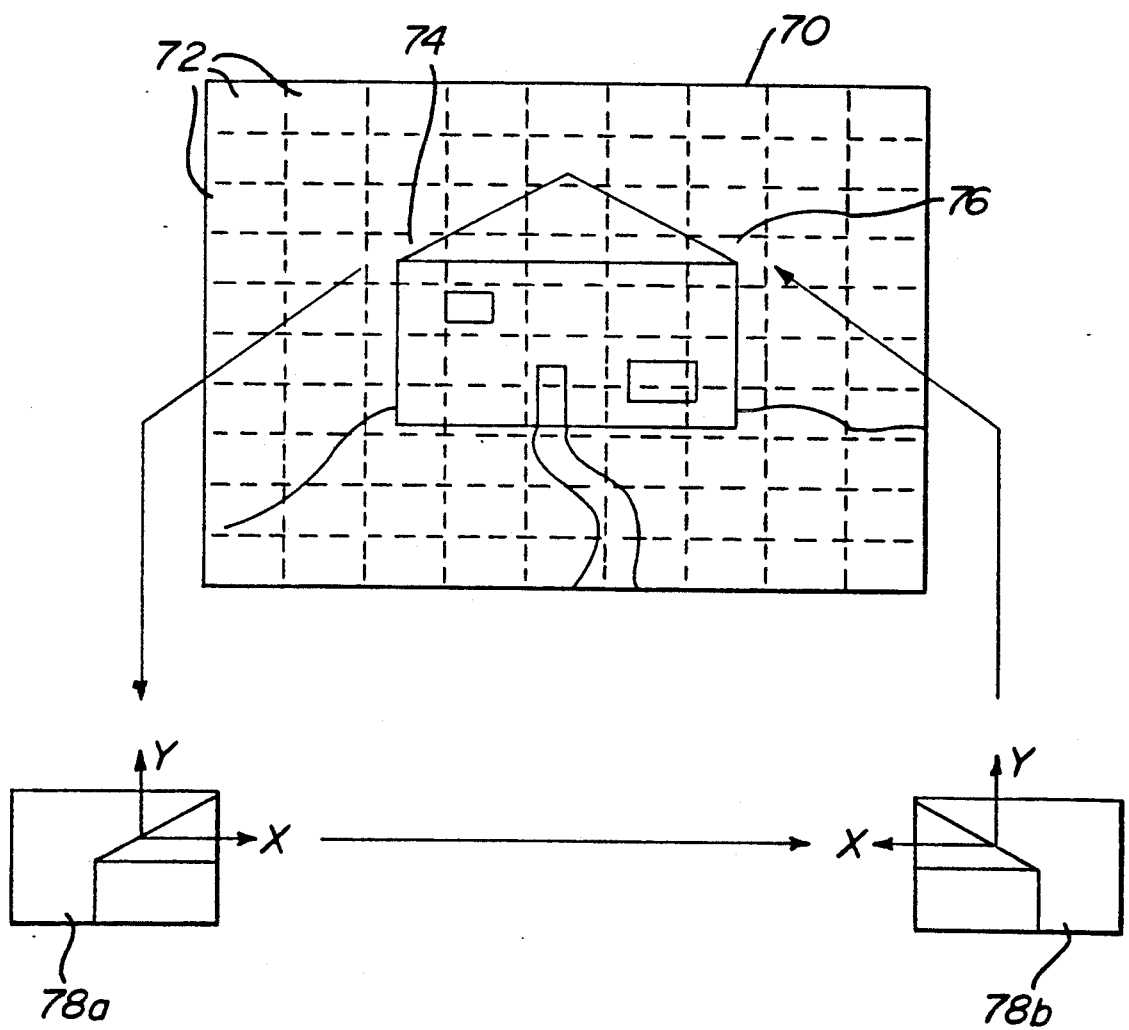
FIG. 6 illustrates the concept of sub-image symmetry often found in a typical image frame.

As mentioned in the background, the sub-images of a typical image frame or group of image frames may exhibit x-axis and/or y-axis symmetry (with plural temporally spaced image frames, there can be temporal symmetry as well, as described hereinafter). FIG. 6 graphically illustrates the concept of sub-image symmetry for an exemplary image frame 70. As mentioned above, in vector quantization of an image frame, e.g. image frame 70, the image frame is first organized into a plurality of sub-images 72 which are then converted to a multidimensional input vector. As illustrated in the figure, however, two of the sub-images 74, 76 exhibit y-axis symmetry. Therefore, a single input vector can represent both sub-images by simply re-orienting (i.e., mirroring) the input vector about the y-axis.

For example, suppose an input vector having an original orientation 78a is constructed from the pixels of sub-image 74. A different orientation 78b of the input vector can represent the symmetrical sub-image 76. The orientation 78b of the input vector is obtained by mirroring the input vector in its original orientation 78a about the y-axis. Thus, different orientations of the input vector are obtained by mirroring the input vector about its axes. It is understood that the input vector in its original orientation 78a could also be mirrored about the x-axis to represent a sub-image (not shown) that is an x-axis mirror image of the sub-image 74. Additionally, the input vector could be mirrored about both the x-axis and the y-axis. Thus, four visually different sub-images can be represented by four different orientation of a single input vector: a first orientation being representative of the original sub-image, a second orientation being representative of the sub-image mirrored about the x-axis, a third orientation being representative of the sub-image mirrored about the y-axis, and a fourth orientation being representative of the sub-image mirrored about the x-axis and y-axis (an input vector constructed from a square sub-image has 8 possible orientations because in addition to mirroring, the vector can be rotated 90 degrees).

As mentioned in the background, the prior art method of "reflected VQ" takes advantage of the symmetry discussed above to reduce the size of the codebook needed to achieve a given level of distortion. "Reflected VQ" is summarized in R. L. Baker, "Vector Quantization of Digital Images", Ph.D. Dissertation, Stanford University, Department of Electrical Engineering 153-62 (1984), which is incorporated herein by reference.

Figure 7:
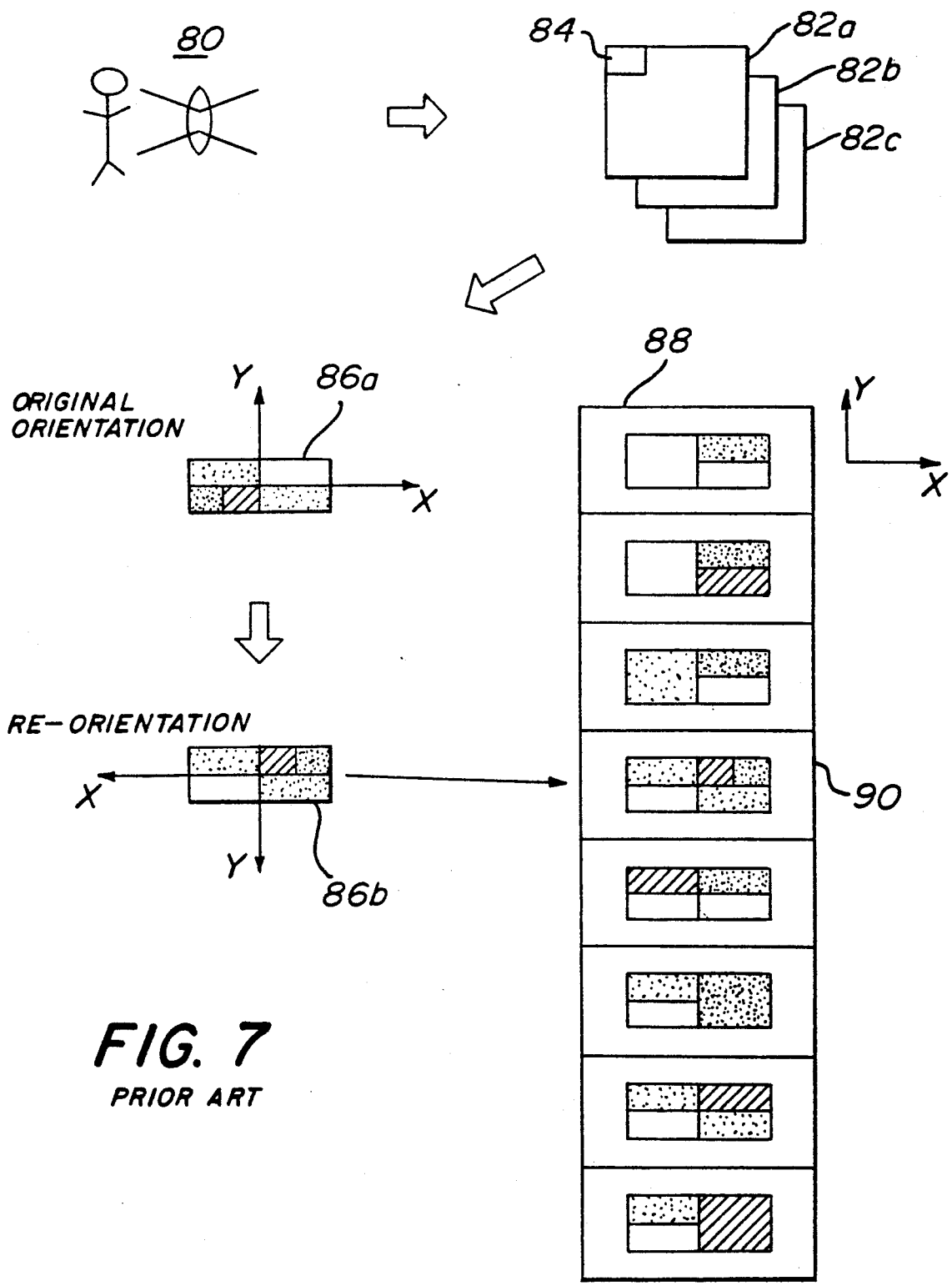
FIG. 7 graphically illustrates a prior art vector quantization method employing mirrored input (image) vectors for searching a codebook.

The prior art method of "reflected VQ" is illustrated graphically in FIG. 7. According to the method, moving images 80 are converted to a plurality of temporally spaced image frames, 82a, 82b, 82c, etc. Vector quantization is begun by receiving the image frames 82 and organizing each frame into blocks (sub-images) of pixels (not shown). The conversion of one block (sub-image) 84 to a multi-dimensional input vector 86a is shown. Input vector 86a is in its original orientation (i.e., the orientation representing the sub-image of pixels substantially as received). As mentioned above, because a single input vector having a number of possible orientations can be used to represent several visually different sub-images that are actually mirror images of each other, a VQ codebook need only store input vectors in one orientation. Accordingly, the codevectors in the codebook 88 of FIG. 7 all have the same general orientation. Where, as in FIG. 7, the codevectors are rectangular, approximately a 4-to-1 reduction in codebook size is achieved (an 8-to-1 reduction could be achieved with square vectors). If desired, the memory saved can be used to hold more representative codevectors, thereby decreasing the overall distortion of transmitted images. Increasing the number of representative codevectors decreases overall distortion, because with more representative codevectors, the likelihood that a very close match will be found for the input vector increases.

The orientation of a codevector may be defined by the average spatial gradient of pixels in the codevector. For example, each codevector in the codebook 88 of FIG. 7 has an average spatial gradient which is positive along the x-axis from left-to-right (an positive gradient being defined herein as a spatial progression from light to dark pixels) and positive along the y-axis from bottom to top. The direction of the gradient along the x-axis and y-axis defines the orientation. It is understood by those skilled in the art that other quantities can be used to define orientation, and the present invention is not limited to any one definition.

Note the spatial gradient along the x-axis of the input vector in its original orientation 86a is negative (from right-to-left). Similarly the gradient along the y-axis is negative (from bottom-to-top). Thus the original orientation of the input vector 86a does not match the orientation of the codevectors in the codebook 88. Consequently, as best shown in the figure, there is no codevector that closely resembles the input vector 86a. Therefore, according to the method of "reflected VQ," the input vector 86a must be re-oriented to match the orientation of the codevectors. In the case of input vector 86a, the vector must be re-oriented along both the x-axis and the y-axis. As mentioned above, re-orientation involves mirroring the input vector about the respective axes. As those skilled in the art will understand, mirroring a two-dimensional vector such as input vector 86a about the x-axis and y-axis simply involves reversing the order of the vectors columns and rows. Re-orientation can be performed by an apparatus such as that disclosed in R. L. Baker, "Vector Quantization of Digital Images", Ph.D. Dissertation, Stanford University, Department of Electrical Engineering 157 (1984). Re-orientation of the input vector 86a results in the same input vector having a different orientation 86b. As can be seen from the figure, the reoriented input vector 86b has positive spatial gradients along both axes. Thus, the orientation of the re-oriented vector 86b now matches the orientation of the codevectors in the codebook 88.

The re-oriented vector 86b can now be compared with the codevectors in the codebook 88. As illustrated in FIG. 7, the comparison produces one codevector 90 that closely resembles the re-oriented input vector 86b. According to the method, this codevector 90 is then selected, and an indication of the address of the selected codevector is transmitted along with additional information specifying the "reflections/mirroring" necessary to recover the original orientation of the input vector. At receiving locations (each employing a VQ decoder), the selected codevector is retrieved from an identical codebook and reoriented to match the original orientation of the input vector, thereby re-creating the input vector in its original orientation at the receiver.

The orientation of a vector may be defined by its average gradient along each axis. However, alternative definitions of orientation are also possible and do not change the applicability of this invention. For example, the orientation of the vector could be defined by its corner weight, but other definitions are also possible.

Figure 8:
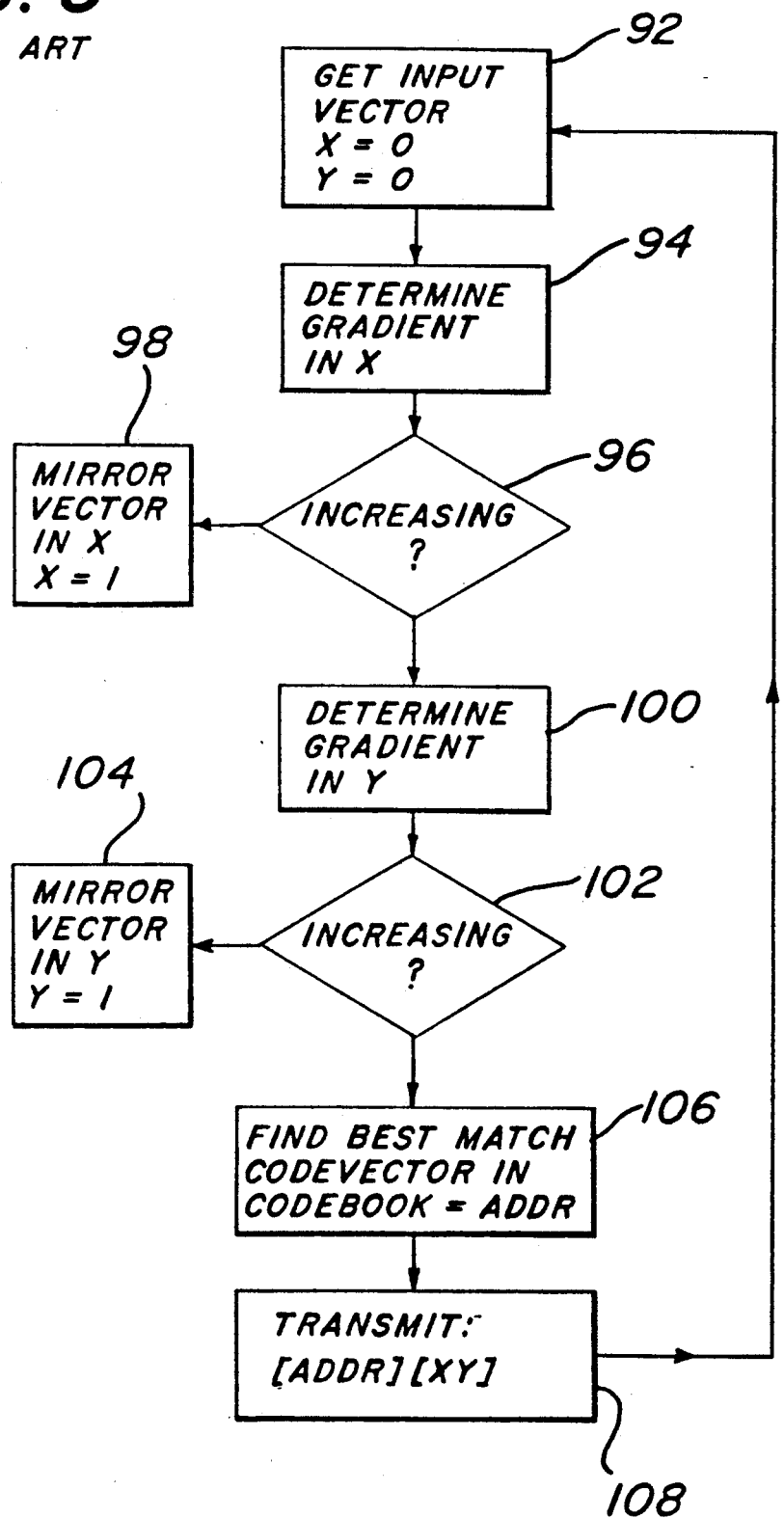
FIG. 8 is a flowchart illustrating the prior art method of FIG. 7 in greater detail.

FIG. 8 is flowchart illustrating the prior art method of "reflected VQ" in greater detail. In the figure, an input vector is received in step 92 and the variables x and y are initialized to a value of 0. Variables x and y define an identifying code assigned to each of the possible orientations of the input vector (e.g., x=0, y=0 is the identifying code assigned to the original orientation of the input vector). Control then passes to step 94 where the spatial gradient of the input vector along the x-axis is calculated. A method of calculating the gradient of an input vector is disclosed in R. L. Baker, "Vector Quantization of Digital Images", Ph.D. Dissertation, Stanford University, Department of Electrical Engineering 160-61 (1984). Assume for the purposes of this description that the codevectors in the codebook are all oriented as described in FIG. 7 (i.e. positive from left-to-right along the x-axis and from bottom-to-top along the y-axis).

Control next passes to step 96 where the spatial gradient of the input vector along the x-axis (determined in step 94) is examined to determine whether it is positive along the x-axis (i.e., the same as the codevectors in the codebook). If so, then the x-axis orientation of the input vector, as originally received, already conforms to the orientation of the codevectors in the codebook. If the gradient is zero (i.e. neither negative nor positive), then as is understood by those skilled in the art, the input vector itself is generally symmetrical about the x-axis. In such situations, obtaining a mirror image of the input vector about the x-axis will not substantially alter the gradient. The x-axis orientation in such situations is therefore treated as if it conforms to the x-axis orientation of the codevectors in the codebook. Accordingly, for the case of a positive or zero x-axis gradient, the input vector is unchanged and control passes to step 100. If the x-axis gradient is negative, however, control passes to step 98 where the input vector is re-oriented by obtaining a mirror image of the input vector about its x-axis. Thus, the re-oriented vector will have a positive x-axis gradient which matches the x-axis orientation of the codebook. The variable x is set to 1 identifying the x-axis re-orientation of the input vector. Control then passes to step 100.

At step 100, the y-axis gradient of the input vector is determined in a manner similar to that of step 94. Control then passes to step 102. As with the x-axis gradient, if the y-axis gradient of the input vector is positive (i.e. matches the codebook gradient) or zero, the input vector is unchanged and control passes to block 106. If, however, the y-axis gradient is negative, control passes to step 104 where the input vector is re-oriented about the y-axis such that it then conforms with the y-axis gradient of the codebook. Also in step 104, the variable y is set to 1 identifying the y-axis reorientation of the input vector. Thus, as a result of any necessary re-orientations, the input vector now has an orientation that matches the orientation of the codevectors in the codebook. Control next passes to step 106.

In step 106, the input vector is compared to the codevectors in the codebook. The codevector most closely resembling the input vector is selected from the codebook. Control then passes to step 108 wherein an indication of the address of the selected codevector and the identifying code (x,y) of the current input vector orientation is transmitted to a plurality of receiving locations.

As described above, each receiving location employs an identical VQ codebook. At each receiving location, the transmitted indication is received and the address of the codevector selected in step 106 is obtained. The obtained address is then employed to retrieve the selected codevector from the codebook. The identifying code, which identifies the re-orientations, if any, performed on the original input vector, is then employed to re-orient the retrieved codevector such that its orientation matches the original orientation of the input vector. Thus, the input vector in its original orientation is reproduced at the receiving location, and from the reproduced input vector, the block (sub-image) of pixels, which the input vector represents, can be re-created for display on a television.

Further description of the "reflected VQ" method, as well as the implementation of apparatus for carrying out the method, can be found in R. L. Baker, "Vector Quantization of Digital Images", Ph.D. Dissertation, Stanford University, Department of Electrical Engineering 153-62 (1984).

As mentioned in the background, VQ encoders employing the prior art "reflected VQ" method must employ a measure of orientation (gradient or corner weight). This measure may not be optimum for any particular distribution of codevectors. The method of the present invention does not introduce a definition of orientation, and the quality may be better than in the prior art.

The method of the present invention, described hereinafter in detail, also provides a decrease in image distortion. Additionally, the method of the present invention achieves this decrease without a costly increase in the complexity of the encoder.

In accordance with the present invention, the VQ encoder at the transmitting location and the decoders at receiving locations all employ full codebooks, i.e., the codebooks contain codevectors in all orientations. The method of the present invention exploits the image symmetry described above differently than the "reflected VQ" technique. The method of the present invention recognizes that although a codevector (in a full codebook having codevectors of all orientations) may be found which closely resembles the input vector in its original orientation, a closer match may be found between a different codevector and the input vector in one of its other possible orientations. If a closer match is found with one of the other orientations of the input vector, then the address of that codevector can be transmitted along with additional information specifying the "reflections/mirroring" necessary to re-orient the codevector to match the original orientation of the input vector. At a receiving location, the selected codevector can be retrieved from the decoder codebook and re-oriented to match the original orientation of the input vector, thereby re-creating the input vector in its original orientation. Thus, without increasing the size of the codebook, closer codevector matches can be found thereby decreasing image distortion.

Figure 9:
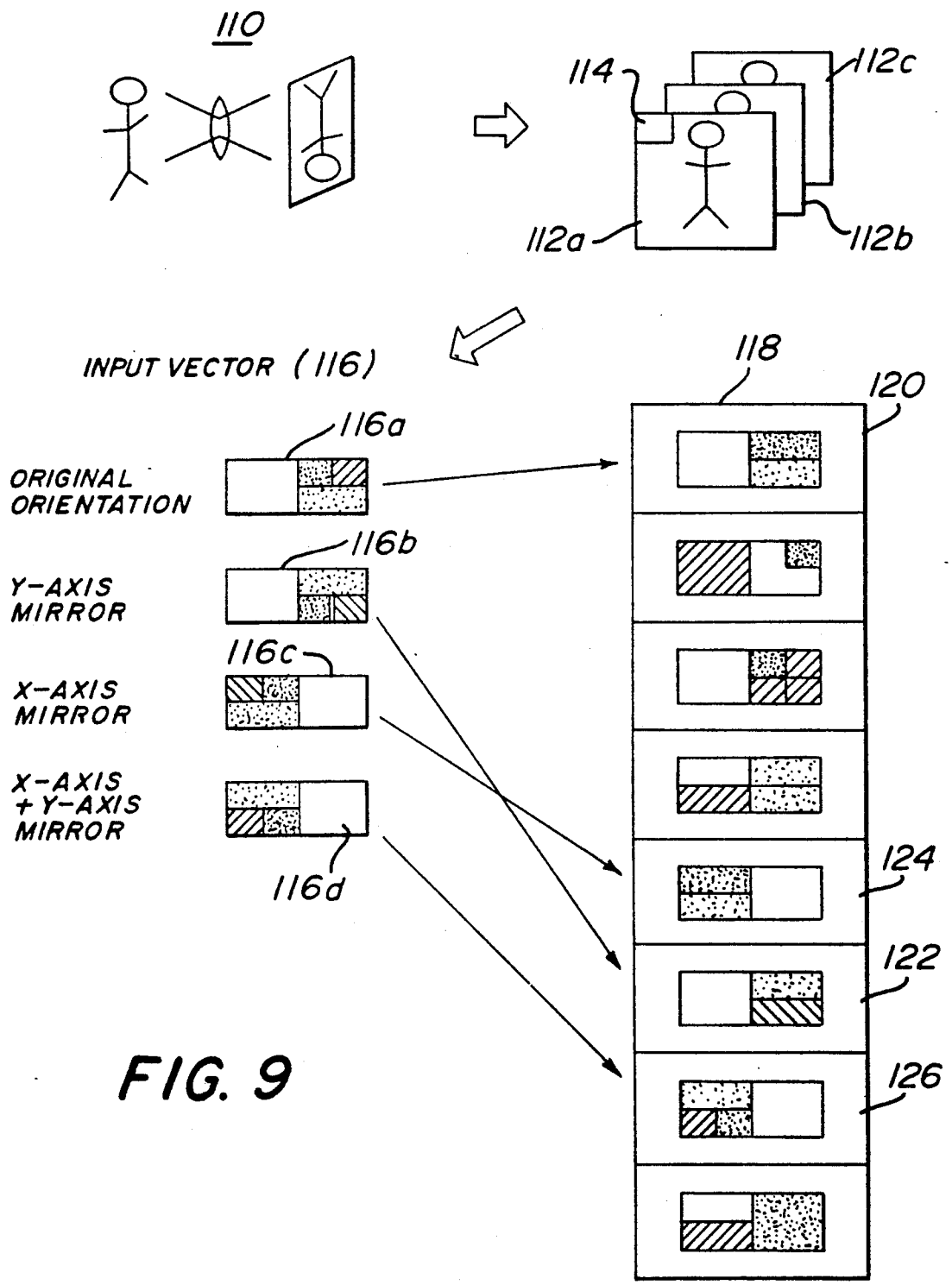
FIG. 9 graphically illustrates the vector quantization method of the present invention employing mirrored input vectors to search a codebook.

The method of the present invention is illustrated graphically in FIG. 9. Moving images 110 are converted to a plurality of temporally spaced image frames, 112a, 112b, 112c, etc. Vector quantization begins at a transmitter location of pay television signals (not shown) by receiving the image frames 112 and organizing each frame into blocks (sub-images) of pixels (not shown). The conversion of one block (sub-image) 114 to a multi-dimensional input vector 116 is shown. The input vector 116 is shown in its original orientation at 116a (i.e., the orientation representing the sub-image of pixels substantially as received).

A codebook 118 is provided that contains codevectors in all orientations (i.e., the spatial gradients of each codevector are not all the same). In the figure, the codebook 118 contains eight codevectors, however, it is understood by those skilled in the art that in practice, the codebook 118 would contain a much greater amount of codevectors. It is also understood by those skilled in the art that FIG. 9 presents a pictorial representation of the codevectors, but in practice the codevectors are stored as digital information and are not themselves visually perceptible.

According to the method of the present invention, each orientation of an input vector is compared to the codevectors of the codebook. In FIG. 9, where the sub-image 114 is a two-dimensional rectangular block of pixels, the input vector 116 will have four possible orientations: a first orientation 116a being representative of the sub-image 114 substantially as received; a second orientation 116b being representative of the sub-image 114 mirrored about the y-axis; a third orientation 116c being representative of the sub-image 114 mirrored about the x-axis; and a fourth orientation being representative of the sub-image 114 mirrored about both the x-axis and the y-axis. It is understood by those skilled in the art that input vectors may have more than four orientations, as is the case with square vectors (8 orientations) or three-dimensional vectors (described hereinafter).

As mentioned, the input vector in each of its orientations 116a, 116b, 116c, 116d is compared to the codevectors in the codebook 118. For each orientation, the codevector that most closely resembles the input vector with that orientation is selected. Thus, as illustrated in FIG. 9, codevector 120 most closely resembles the input vector in its original orientation 116a; codevector 122 most closely resembles the input vector in its second orientation 116b (mirrored about the y-axis); codevector 124 most closely resembles the input vector in its third orientation 116c (mirrored about the x-axis); and codevector 126 most closely resembles the input vector in its fourth orientation 116d (mirrored about the x-axis and the y-axis).

According to the method of the present invention, for each orientation and associated selected codevector, a measure of distortion is obtained between the input vector in that orientation and the associated selected codevector. The orientation and associated codevector producing the least measure of distortion are then selected. In FIG. 9, it can be seen that the input vector in its fourth orientation 116d and the associated selected codevector 126 will produce the least measure of distortion (this is evident from the figure since the two vectors are visually indistinguishable, while the others are not nearly so similar). An indication is then transmitted of the address of the selected codevector 126 along with additional information specifying the "reflections/mirroring" necessary to recover the original orientation 116a of the input vector. In this example, the additional information would specify that the selected codevector must be mirrored about the x-axis and the y-axis to recover the original orientation.

At a receiving location, the selected codevector can be retrieved from the decoder codebook using the transmitted address. The additional orientation information (also transmitted) can then be employed to re-orient the selected codevector to match the original orientation of the input vector, thereby re-creating the input vector in its original orientation. The block of pixels can then be reconstructed from the input vector for display on a television set. Because a closer codevector match is achieved at the transmitter, the method of the present invention decreases image distortion at the receiving location.

Figure 10:
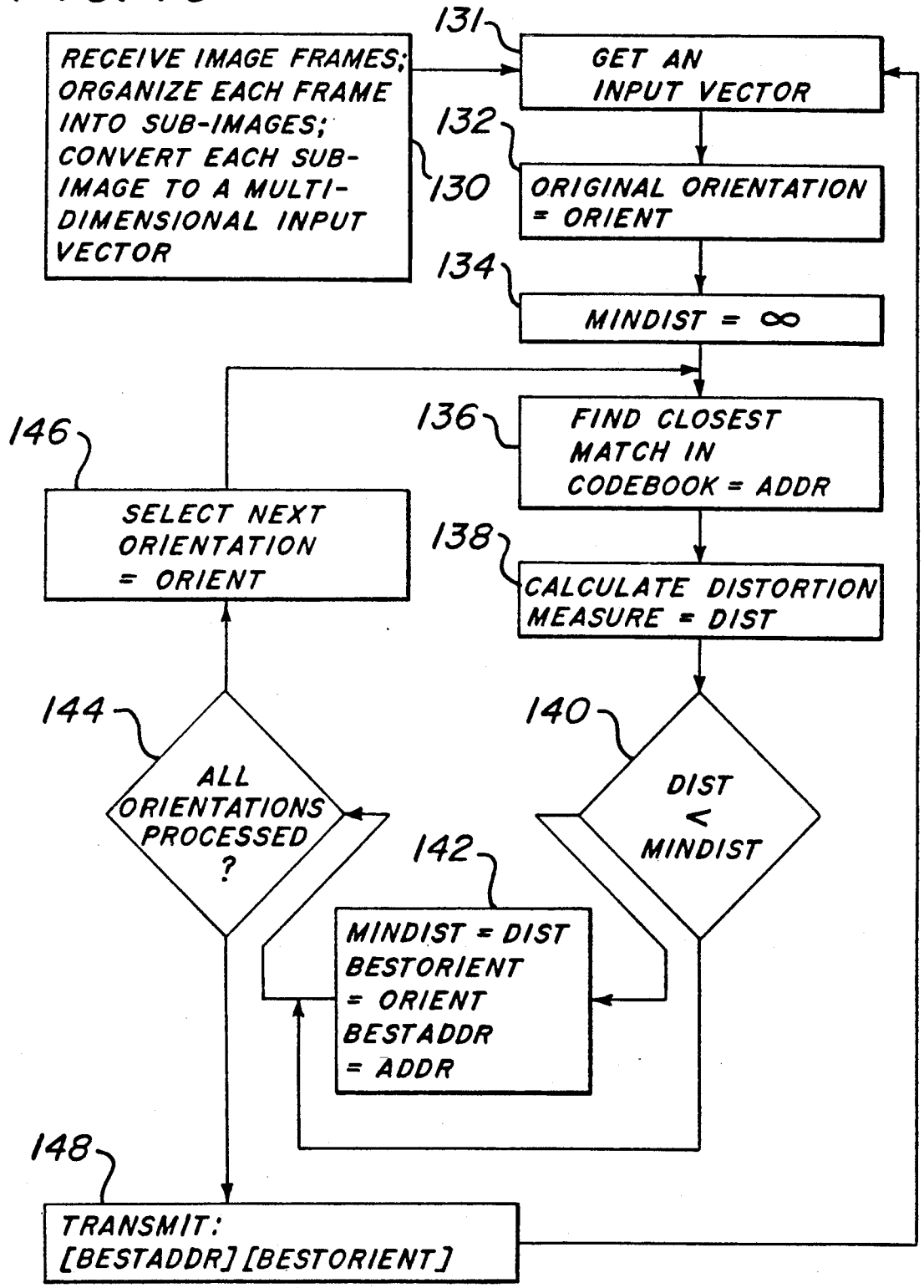
FIG. 10 is a flowchart illustrating the method of the present invention as carried out at a transmitter location.

FIG. 10 is a flowchart illustrating in greater detail a preferred embodiment of the method of the present invention as carried out at a transmitter location of pay television signals (e.g., transmitter location 12 of FIG. 1). A first vector quantization codebook is provided in a memory at the transmitter location. The codebook contains a plurality of codevectors in all orientations, each representative of a possible input vector. Each codevector has an associated memory address.

In step 130, a series of temporally spaced image frames representing moving images are received. Each image frame is then organized into a plurality of blocks (sub-images) of pixels, and each block is converted to a multi-dimensional input vector having a plurality of possible orientations. Each of the orientations is assigned an identifying code. As has already been discussed, each orientation of an input vector represents substantially the same sub-image mirrored about one or more of its axes. In the preferred embodiment, each sub-image is a two-dimensional rectangular block of pixels, and as a result, each input vector has four possible orientations. In step 131, an input vector is selected for processing. The selected input vector is, of course, in its original orientation (i.e., representing the sub-images substantially as received).

Control next passes to step 132 wherein the identifying code of the original orientation is stored in a variable, ORIENT, and control passes to step 134. In step 134, a variable MINDIST is created and initialized to infinity. As described below, MINDIST holds a measure of difference (distortion) between an input vector and an associated codevector, as described hereinafter in greater detail. From step 134, control passes to step 136.

In step 136, the input vector (currently in its original orientation) is compared to the codevectors in the codebook. The codevector that most closely resembles the input vector is selected. Control then passes to step 138 where a measure of difference (distortion), if any, between the input vector and the selected codevector is obtained. As those skilled in the art know, a number of measures of difference can be employed in a vector quantizer. See, e.g., Gray, R. M., "Vector Quantization", *IEEE ASSP Mag.*, Vol. 1, pp. 4-29 (April 1984). It is within the spirit and scope of the present invention to employ any of these measures of difference in step 138. After obtaining a measure of difference, control passes to step 140.

In step 140, the measure of difference obtained in step 138 is compared to the distortion value in MINDIST. If the measure of difference obtained in step 138 is less than the value stored in MINDIST, then control passes to step 142. However, if the measure of difference obtained in step 140 is greater than or equal to the value stored in MINDIST then control passes to step 144.

When the measure of difference is less than the value stored in MINDIST (as will be the case the first time step 140 is performed because MINDIST=infinity), control passes to step 142. At step 142, the identifying code of the current orientation (which the first time through the loop is the original orientation) is stored in BESTORIENT (e.g. BESTORIENT=ORIENT), and the address of the selected codevector is stored in BESTADDR. Control then passes to step 144.

Step 144 passes control to step 148 if all orientations of the input vector have been processed, but passes control to step 146 if not all orientations of the input vector have been processed. The first time through the loop, only the input vector in its original orientation has been processed, so step 144 passes control to step 146.

In step 146, another one of the orientations of the input vector is selected. As discussed above, for a two-dimensional rectangular input vector, the different orientations can be obtained by reversing the order of the vector's rows, columns or both. As also discussed above, an apparatus for obtaining different orientations of an input vector is disclosed in R. L. Baker, "Vector Quantization of Digital Images", Ph.D. Dissertation, Stanford University, Department of Electrical Engineering 156-60 (1984). However, it is understood by those skilled in the art that any suitable method and/or apparatus for obtaining a different orientation of the input vector could be used without deviating from the spirit and scope of the present invention. After selecting a different one of the orientations of the input vector, the identifying code of this selected orientation is stored in ORIENT. Control then next passes to step 136 where the input vector with the newly selected orientation is compared to the codevectors in the codebook, and the codevector most closely resembling the input vector in its newly selected orientation is selected. As before, in step 138, a measure of difference is obtained between the input vector with the selected orientation and the selected codevector. The measure of difference is then compared to the value in MINDIST.

As mentioned above, if the measure of difference is less than the value in MINDIST, control passes to step 142 where the identifying code currently in BESTORIENT is replaced with the identifying code of the currently selected orientation of the input vector and the address of the currently selected codevector is stored in BESTADDR. Thus, BESTORIENT and BESTADDR will always contain the identifying code and address respectively of the input vector orientation and associated codevector that have provided the least measure of difference in step 138. Control then passes to step 144.

As described above, however, if the measure of difference obtained in step 138 had not been less than the value in MINDIST, then control would have passed directly from step 140 to step 144.

The method of the present invention proceeds as described above until it is determined in step 144 that each of the possible orientations of the input vector has been processed. Once all orientations have been processed, control passes to step 148. As is understood by those skilled in the art, when control passes to step 148, the variables BESTORIENT and BESTADDR contain the identifying code and address respectively of the input vector orientation and associated codevector that provided the least measure of difference in step 138. In step 148, an indication of the address in BESTADDR and the identifying code in BESTORIENT is transmitted to a plurality of receiving locations.

Figure 11:
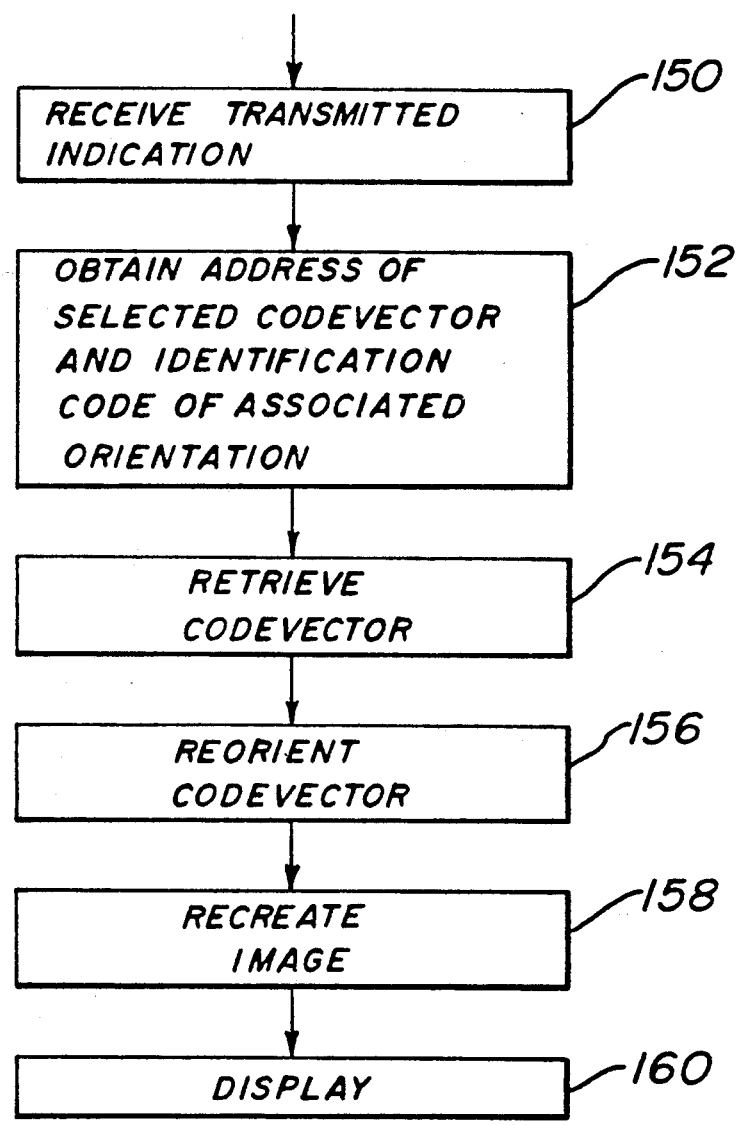
FIG. 11 is a flowchart illustrating the method of the present invention as carried out at a receiving location.

Referring now to FIG. 11, there is shown a flowchart illustrating a preferred embodiment of the method of the present invention as carried out at each of a plurality of receiving locations (e.g., cable head-end 14 or a pay television subscriber employing decoder 36 of FIG. 1). A second vector quantization codebook (not shown) is provided in a memory at each receiving location. The second vector quantization codebook is identical to the first vector quantization codebook at the transmitter location.

In step 150, an indication transmitted from the transmitter location is received and control passes to step 152. In step 152, the identifying code of the orientation (BESTORIENT of FIG. 10) and the address of the associated codevector (BESTADDR of FIG. 10) are obtained from the received indication. Control then next passes to step 154 wherein the codevector residing at the obtained address is retrieved from the second codebook thereby substantially reproducing the codevector at the receiver location. Control then passes to step 156.

In step 156, the identifying code (which indicates the reflections/mirroring necessary to obtain the original orientation of the input vector) and the reproduced codevector are employed to substantially re-orient the reproduced codevector. The re-oriented codevector is a substantial reproduction of the input vector in its original orientation. Control next passes to step 158 where the re-oriented codevector is employed to re-create the block (sub-image) of pixels. The re-created block of pixels is then displayed on a television set at the receiver location in step 160.

Thus, the method of the present invention, as described above, increases the reproduction quality of vector quantized data (i.e., decreases distortion) by employing mirrored input vectors to obtain the closest possible matching codevector in the codebook.

In another embodiment of the present invention, the method of the present invention is combined with a method known in the art as three-dimensional VQ. In three-dimensional VQ, a three-dimensional input vector is constructed from identical portions of a plurality of temporally spaced image frames. Three-dimensional VQ is a method well known to those skilled in the art.

Figure 12:
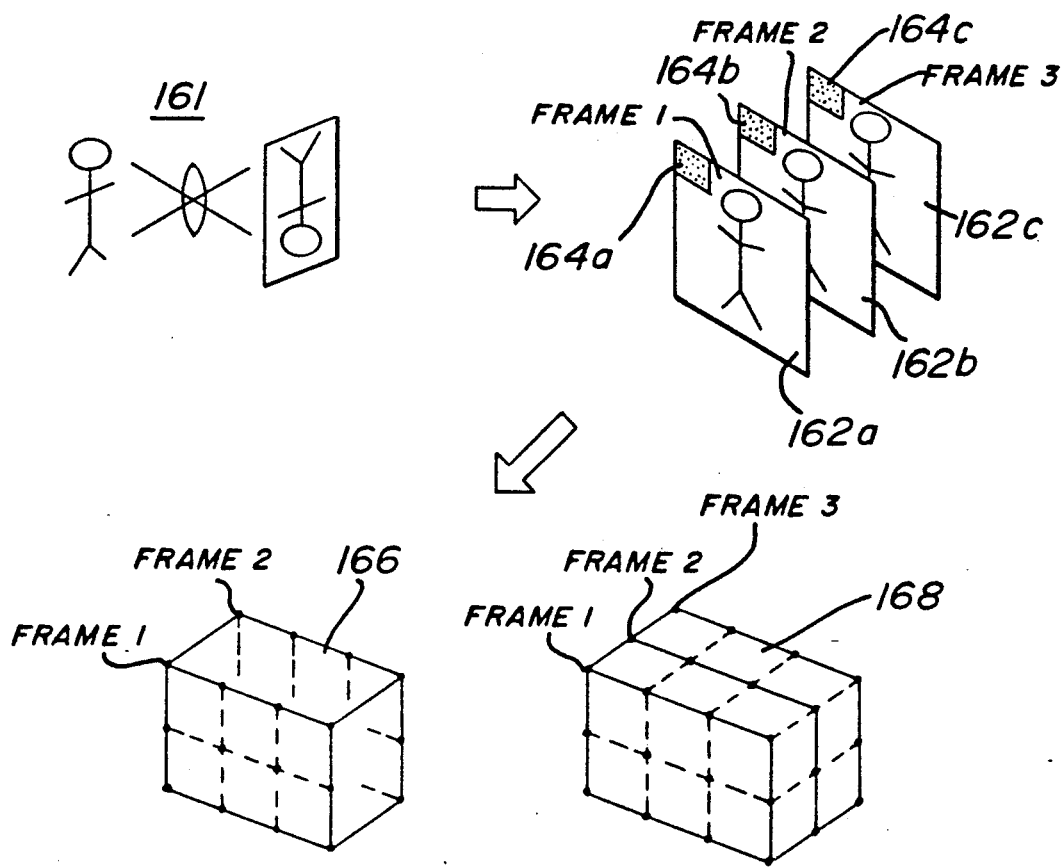
FIG. 12 graphically illustrates the concept of constructing a three-dimensional input vector from identical portions of a plurality of temporally spaced image frames.

FIG. 12 illustrates the concept of converting moving or dynamic images 161 into a plurality of temporally spaced image frames 162a, 162b, 162c, etc. In three-dimensional VQ (hereinafter 3D-VQ), pixels are selected from identical portions 164 of more than one of the temporally spaced image frames 162. A three-dimensional input vector is then constructed from the selected pixels. Thus, for example a three-dimensional input vector 166 can be constructed from identical portions 164a, 164b of two of the temporally spaced image frames 162a, 162b respectively. Alternatively, a three-dimensional input vector 168 could be constructed from identical portions 164a, 164b, 164c of three of the temporally spaced image frames 162a, 162b, 162c respectively. It is understood by those skilled in the art that a three-dimensional input vector can be constructed from identical portions of any number of temporally spaced image frames. Image frames are typically two-dimensional and have an x-axis and a y-axis. The third dimension, or z-axis, of a three-dimensional input vector represents the temporal spacing between adjacent image frames.

Recall from above that the sub-images of a typical image frame or group of image frames often exhibit x-axis and/or y-axis symmetry. With a plurality of temporally spaced image frames, there can be temporal symmetry as well. As a result, there is often a high degree of symmetry along the temporal or z-axis of a three-dimensional input vector. Thus, in addition to mirroring a three-dimensional input vector about the x-axis and the y-axis, the three-dimensional input vector can be mirrored about the z-axis as well.

Figure 13:
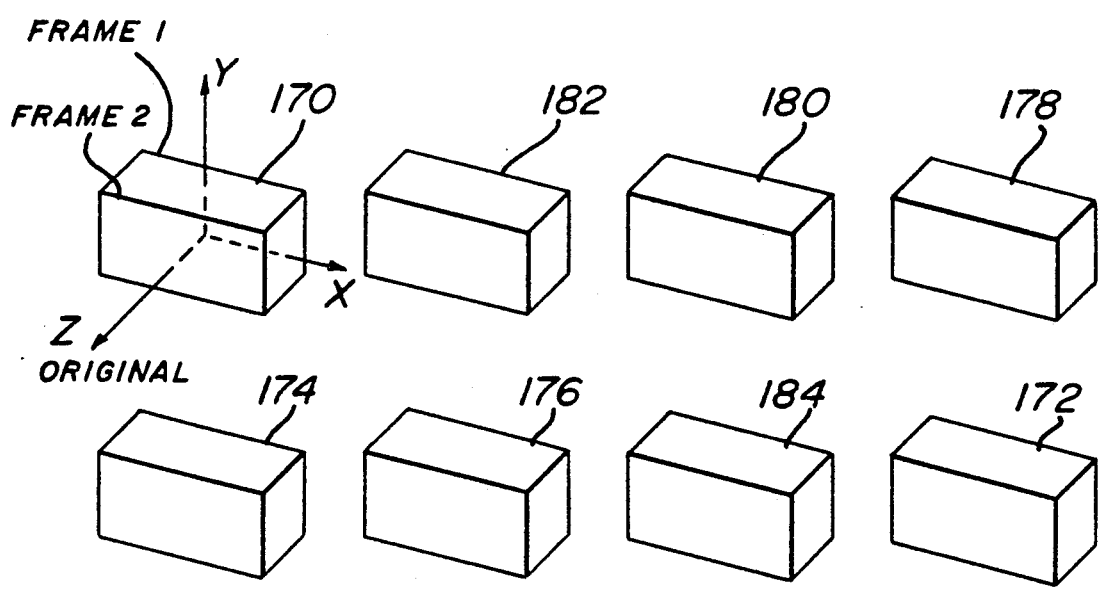
FIG. 13 graphically illustrates the concept of mirroring a three-dimensional input vector about the x-axis, the y-axis, and the z-axis to obtain eight possible orientations of the input vector.

A three-dimensional rectangular input vector (i.e., where the portions of each image frame are rectangular), such as 166 or 168, has 8 possible orientations. FIG. 13 illustrates the 8 possible orientations. The original input vector 170 can be mirrored about the x-axis 172, the y-axis 174, the z-axis 176, the x-axis and y-axis 178, the x-axis and z-axis 180, the y-axis and z-axis 182, or all three 184. It is understood by those skilled in the art that a three-dimensional cubic input vector (i.e. where the portions of each image frame are squares) has 32 possible orientations because the input vector can be rotated in addition to mirroring. It is also understood by those skilled in the art that the present invention is not limited to rectangular or cubic input vectors; any three-dimensional input vector structure may be employed.

By combining portions of temporally spaced image frames, 3D-VQ generally achieves a higher degree of image compression. Furthermore, when 3D-VQ is combined with the method of the present invention, a further increase in the quality of image reproduction (i.e., decrease in distortion) can be achieved.

The invention has been described above as being carried out in the spatial domain, i.e., the codevectors stored in the codebooks are representative of the spatial placement of the pixels in each image frame, and the input vectors constructed from the image frame data are representative of the spatial placement of an actual block of pixels from an image frame. However, the invention is not limited to implementation in the spatial domain. The invention may also be carried out in the transform, or frequency, domain wherein, instead of storing spatial codevectors as above described, their transforms are calculated and the transformed codevectors are stored in the codebook. For example, each codevector would be replaced by its cosine (Fourier) transform, and each input vector would be transformed prior to searching the codebook. In this case, the codebook would still be constructed as described above, but entries would correspond to the transformed vector space. Thus, in the encoder at a transmitter location, the tree search would be carried out in the transform domain. However, the decoders at receiver locations would remain unchanged, i.e., the codebook in each decoder would continue to operate in the spatial domain. The advantage of this approach is that it is believed that it would result in fewer "block" artifacts commonly found in VQ encoder/decoder schemes.

From the foregoing description, it can be seen that the present invention comprises a method for employing mirrored input vectors to search a vector quantization codebook thereby increasing the reproduction quality (i.e., decreasing distortion) of re-created image data. In an alternate embodiment, the method of the present invention is combined with a three-dimensional VQ method. It will be appreciated by those skilled in the art that changes could be made to the embodiments described above without departing from the broad inventive concepts thereof. It is understood, therefore, that this invention is not limited to the particular embodiments disclosed, but is intended to cover all modifications which are within the scope and spirit of the invention as defined by the appended claims.

What is claimed is:

1. In a data compression system employing a vector quantization codebook having a plurality of codevectors each representative of a possible input vector, each codevector having an associated address, a method comprising the steps of:

a) receiving data to be compressed, and converting the data to a multi-dimensional input vector having a plurality of possible orientations, and assigning an identifying code to each orientation;

b) selecting one of the orientations;

c) comparing the input vector with the selected orientation to the codevectors of the codebook and selecting the codevector that most closely resembles the input vector with the selected orientation;

d) obtaining a measure of difference, if any, between the input vector with the selected orientation and the selected codevector;

e) selecting other ones of the remaining orientations of the input vector and, for each other selected orientation, repeating steps (c) and (d);

f) selecting the orientation and associated codevector that provided the least measure of difference in step (d); and g) transmitting an indication of at least the address of the codevector and the identifying code of the orientation selected in step (f).

2. Method according to claim 1 wherein the multi-dimensional input vector is a two-dimensional vector and there are 4 possible orientations.

3. Method according to claim 1 wherein the received data to be compressed is image data comprising a two dimensional matrix of pixels having an x-axis and a y-axis, and wherein the two dimensional matrix of pixels is converted to a two-dimensional vector having four possible orientations, a first orientation being representative of the matrix of pixels substantially as received, a second orientation being representative of the matrix of pixels mirrored about the x-axis, a third orientation being representative of the matrix of pixels mirrored about the y-axis, and a fourth orientation being representative of the matrix of pixels mirrored about both the x-axis and the y-axis.

4. Method according to claim 1 wherein the multi-dimensional input vector is a three-dimensional vector and there are 32 possible orientations, and wherein 8 of the 32 possible orientations are selected in steps (c) through (e).

5. Method according to claim 1 wherein the received data to be compressed is image data comprising temporally spaced image frames representing moving images, and each image frame is defined by a plurality of pixels, and wherein step (a) comprises:

(a') receiving a plurality of temporally spaced image frames to be compressed;

(b') selecting pixels from a substantially identical portion of each of the temporally spaced image frames; and (c') constructing the multi-dimensional input vector from the pixels selected from said portions.

6. Method according to claim 5 wherein each temporally spaced image frame comprises a two-dimensional matrix of pixels having an x-axis and a y-axis, and wherein the plurality of temporally spaced image frames comprises two temporally adjacent image frames, and wherein the pixels selected from the portions of the temporally adjacent image frames define a three-dimensional substantially cubic arrangement of pixels having an x-axis and a y-axis and a z-axis, the z-axis being defined by the temporal spacing between the adjacent image frames, and further wherein a three-dimensional input vector is constructed from the three-dimensional cubic arrangement of pixels and has 32 possible orientations, and still further wherein steps (c) through (e) are performed with 8 of the 32 possible orientations; a first orientation being representative of the cubic arrangement of pixels formed by the portions of the image frames substantially as received, a second orientation being representative of the cubic arrangement of pixels mirrored about the x-axis, a third orientation being representative of the cubic arrangement of pixels mirrored about the y-axis, a fourth orientation being representative of the cubic arrangement of pixels mirrored about the z-axis, a fifth orientation being representative of the cubic arrangement of pixels mirrored about the x-axis and the y-axis, a sixth orientation being representative of the cubic arrangement of pixels mirrored about the x-axis and the z-axis, a seventh orientation being representative of the cubic arrangement of pixels mirrored about the y-axis and the z-axis, and an eighth orientation being representative of the cubic arrangement of pixels mirrored about the x-axis and the y-axis and the z-axis.

7. Method according to claim 1 wherein the data comprises image data, and wherein the image data comprises temporally spaced image frames representing moving images to be displayed on a television set, each image frame being defined by a plurality of pixels, and wherein step (a) comprises:

(a') receiving data indicative of image frames to be compressed;

(b') organizing each image frame into a plurality of blocks of pixels; and (c') converting each block of pixels to a multi-dimensional input vector, and wherein steps (b) through (g) are performed for each input vector.

8. Method according to claim 7 wherein each pixel has at least an associated intensity value and the received data is digital data indicative of at least the intensity value of each pixel, and further wherein at least ones of the input vectors comprise digital intensity data for a rectangular block of pixels in the image frame.

9. Method according to claim 7 wherein each image frame represents a color image, each pixel within each image frame having at least associated luminance and chrominance values, at least ones of the input vectors being representative of the luminance and chrominance values for a rectangular block of pixels in the image frame.

10. Method according to claim 7 wherein steps (a) through (g) are performed at a transmitter location and the television set is remote from the transmitter location, and the following additional steps are performed at the location of the television set:

(a') providing a substantially identical vector quantization codebook;

(b') receiving each indication transmitted from the transmitter location, obtaining therefrom the identifying code of the orientation and the address of the codevector, and retrieving from the substantially identical codebook the codevector residing at the obtained address to substantially reproduce the codevector selected in step (f); and (c') employing the identifying code of the orientation and the reproduced codevector to substantially re-orient the reproduced codevector, if necessary, so as to substantially re-create each block of image frame data for display of the moving images on the television set.

11. Method according to claim 1 wherein the vector quantization codebook is a tree-search vector quantization codebook.

12. Method according to claim 1 wherein the codevectors of the codebook are transformed to a transform domain before being provided in the codebook and the codevectors are stored in the codebook in the transform domain, and wherein each input vector is transformed to the transform domain for selecting one of the codevectors from the codebook.

13. Method of transmitting image data from a first location to a second location wherein the image data comprises temporally spaced image frames representing moving images, each image frame being defined by a plurality of pixels, comprising the steps of:

(a) receiving data indicative of image frames to be transmitted, and organizing each image frame into a plurality of blocks of pixels, and converting each block of pixels to a multi-dimensional input vector, each input vector having a plurality of possible orientations, and assigning an identifying code to each orientation;

b) providing, in a memory at the first location, a first vector quantization codebook having a plurality of codevectors each representative of a possible input vector, each codevector having an associated address;

c) performing the following steps for each input vector:
   i) selecting one of the orientations of the input vector;
   ii) comparing the input vector with the selected orientation to the codevectors of the codebook and selecting the codevector that most closely resembles the input vector with the selected orientation;
   iii) obtaining a measure of difference, if any, between the input vector with the selected orientation and the selected codevector;
   iv) selecting other ones of the remaining orientations of the input vector and, for each other selected orientation, repeating steps (ii) and (iii);
   v) selecting the orientation and codevector that provided the least measure of difference in step (iii);
   vi) transmitting from the first location an indication of at least the address of the codevector and the identifying code of the orientation selected in step (v);

d) performing the following additional steps at the second location:
   i) providing, in a memory at the second location, a second vector quantization codebook substantially identical to the first codebook;
   (ii) receiving each indication transmitted from the first location, obtaining therefrom the identifying code of the orientation and the address of the codevector selected in step (c)(v), and retrieving from the second codebook the codevector residing at the obtained address to substantially reproduce the codevector selected in step (c)(v); and
   (iii) employing the identifying code of the orientation and the reproduced codevector to substantially re-orient the reproduced codevector, if necessary, so as to substantially re-create each block of image frame data.

14. Method according to claim 13 wherein the first location is a transmitter location of television signals, and wherein the second location is a reception site in a cable television distribution network.

15. Method according to claim 14 wherein the re-created blocks of image frame data are encoded in NTSC format and the NTSC encoded data is distributed to a plurality of cable television subscriber locations via the cable television distribution network for display of the moving images on a television set at each subscriber location.

16. Method according to claim 14 wherein the first location is a transmitter location of pay television signals, and wherein the second location is the location of a pay television subscriber, and wherein the blocks of image frame data are re-created for display on a television at the locale of the pay television subscriber.

17. Method according to claim 14 or 16 wherein the indications are transmitted from the first location to the second location via satellite.

18. Method according to claim 13 or 14 wherein the codevectors of the first codebook are transformed to a transform domain before being provided in the first codebook, and the codevectors are stored in the first codebook in the transform domain, and wherein each input vector is transformed to the transform domain for selecting one of the codevectors from the first codebook.

19. Method according to claim 12 or 18 wherein the transform domain is the frequency domain and the codevectors and input vectors are transformed to the frequency domain by a Fourier transform.

20. In a pay television system, a method of transmitting image data from a transmitter location of pay television signals to a plurality of receiving locations of pay television signals wherein the image data comprises temporally spaced image frames representing moving images to be displayed on a television set, each image frame being defined by a two-dimensional matrix of pixels having an x-axis and a y-axis, comprising the steps of:

(a) receiving data indicative of image frames to be transmitted, and organizing each image frame into a plurality of two-dimensional blocks of pixels, and converting each block of pixels to a two-dimensional input vector, each input vector having four possible orientations, a first orientation being representative of the block of pixels substantially as received, a second orientation being representative of the block of pixels mirrored about the x-axis, a third orientation being representative of the block of pixels mirrored about the y-axis, and a fourth orientation being representative of the block of pixels mirrored about both the x-axis and the y-axis;

b) assigning an identifying code to each of the possible orientations;

c) providing, in a memory at the transmitter location, a first vector quantization codebook having a plurality of codevectors each representative of a possible input vector, each codevector having an associated address;

d) performing the following steps for each input vector:
   i) selecting one of the orientations of the input vector;
   ii) comparing the input vector with the selected orientation to the codevectors of the codebook and selecting the codevector that most closely resembles the input vector with the selected orientation;
   iii) obtaining a measure of difference, if any, between the input vector with the selected orientation and the selected codevector;
   iv) selecting other ones of the remaining orientations of the input vector and, for each other selected orientation, repeating steps (ii) and (iii);
   v) selecting the orientation and associated codevector that provided the least measure of difference in step (iii);
   vi) transmitting an indication of at least the identifying code of the orientation and the address of the associated codevector selected in step (v);

d) performing the following additional steps at each receiving location:

i) providing, in a memory at the receiving location, a second vector quantization codebook substantially identical to the first codebook;

ii) receiving each transmitted indication, obtaining therefrom the identifying code of the orientation and the address of the codevector selected in step (c)(v), and retrieving from the second codebook the codevector residing at each obtained address to substantially reproduce each codevector selected in step (c)(v);

(iii) employing each identifying code and reproduced codevector to substantially re-orient each reproduced codevector, if necessary, so as to substantially re-create each block of pixels; and (iv) reconstructing each image frame from the re-created blocks of pixels for display on a television set at the receiver location.

* * * * *